United States Patent [19]

Tanaka et al.

[11] 4,324,711

[45] Apr. 13, 1982

[54] MELT-ADHESIVE TRAFFIC PAINT COMPOSITION

[75] Inventors: Tsugio Tanaka, Ageo; Kohichi Hashimoto, Urawa; Yukio Nagasaka, Kawagoe, all of Japan

[73] Assignee: Atom Chemical Paint Co., Ltd., Tokyo, Japan

[21] Appl. No.: 45,020

[22] Filed: Jun. 4, 1979

Related U.S. Application Data

[63] Continuation-in-part of Ser. No. 805,465, Jun. 10, 1977, abandoned.

[30] Foreign Application Priority Data

Jun. 29, 1976 [JP] Japan ................... 51-76044

[51] Int. Cl.³ .................. C08L 77/08; C08L 93/04; C09D 3/42
[52] U.S. Cl. ...................... 523/172; 106/19; 106/219; 404/24; 524/606; 524/159; 524/270; 524/296; 524/297; 524/298; 524/385
[58] Field of Search .............. 260/24, 18 PN, 31.8 B, 260/33.4 R, 31.8 N, 37 N, 18 N; 404/24; 106/19, 219; 560/76

[56] References Cited

U.S. PATENT DOCUMENTS

| | | | |
|---|---|---|---|
| 3,030,870 | 4/1962 | Gill | 404/14 |
| 3,449,273 | 6/1969 | Kettenring et al. | 260/18 N |
| 3,792,002 | 2/1974 | Krieger et al. | 260/18 N |
| 3,842,027 | 10/1974 | Richardson | 260/31.8 B |
| 3,911,191 | 10/1975 | Guastella | 427/179 |
| 4,018,733 | 4/1977 | Lopez | 260/18 PN |
| 4,105,808 | 8/1978 | McKenzie | 427/137 |

FOREIGN PATENT DOCUMENTS

1251377 10/1971 United Kingdom .......... 260/18 PN

*Primary Examiner*—Allan Lieberman
*Attorney, Agent, or Firm*—Armstrong, Nikaido, Marmelstein & Kubovcik

[57] ABSTRACT

A melt-adhesive traffic paint composition having improved low temperature stability is disclosed which comprises 20–35% by weight of a dimer acid-modified polyamide resin, 1–5% by weight of a plasticizer, 30–45% by weight of an inorganic filler, and balance a coloring pigment and a reflective agent. The composition may further comprise a thermoplastic resin such as hydrogenated rosin or a rosin-modified maleic acid resin. The resultant paint has improved low temperature stability and improved abrasion resistance and is thus highly resistant to the action of spike tires or tire chains.

12 Claims, No Drawings

MELT-ADHESIVE TRAFFIC PAINT COMPOSITION

BACKGROUND OF THE INVENTION

This application is a continuation-in-part application of an earlier application Ser. No. 805,465 filed June 10, 1977, now abandoned.

This invention relates to traffic paint compositions based on dimer acid-modified polyamide resins having improved low temperature stability and improved freeze and abrasion resistance.

In winter, particularly in snowy or cold areas, it is common to mount spike tires on automobiles or to attach chains around tires to ensure safe driving. The spike tires and chains wound around tires not only cause damage to road surfaces to a large extent, but also tend to shorten the effective life of traffic signs marked on road surfaces for guiding and guarding walkers and automobiles in a safe and obvious manner.

Among prior art traffic paints there are known those of a melt-adhesive type based on alkyd- or rosin-modified polyester resins or petroleum resins, those of a solvent type based on high viscosity solvents, and those of a pressure-sensitive adhesive type in which a rubber or vinyl sheet having an adhesive previously applied on the back thereof is attached on a road surface. Any of these are susceptible to damage when spike tires or tire chains pass over them.

It is believed that this drawback mainly results from the fact that since every resin employed as a base of the above-described traffic paints has a low molecular weight, automobiles passing over a paint coating of such material chop the coating and thereby reduce its durability.

OBJECTS AND SUMMARY OF THE INVENTION

An object of the present invention is to provide a melt-adhesive traffic paint composition which is strongly resistant to the action of spike tires or tire chains of automobiles, has improved low temperature stability and improved freeze resistance and abrasion resistance. Such paints can be handled in the same manner as conventional hot-melt traffic paints.

According to the present invention, there is provided a melt-adhesive traffic paint composition comprising 20-35% by weight of a dimer acid-modified polyamide resin, 1-5% by weight of a plasticizer, 30-45% by weight of an inorganic filler, and balance a coloring pigment and a reflective agent.

DETAILED DESCRIPTION OF THE INVENTION

The above-formulated traffic paint compositions have a durability about 10 times higher than conventional ones under normal conditions when applied as road surface traffic signs.

It is also contemplated that the composition further includes other desired additives such as anti-settling agents, antioxidants, and anti-thermal-degradation agents.

It has been found that the addition of 2-15% by weight of a thermoplastic resin to the above-formulated traffic paint compositions can further improve the abrasion resistance, weatherability, fluidity, low temperature stability and adhesion of the paint. To this end, hydrogenated rosin or a rosin-modified maleic acid resin may be added as the thermoplastic resin.

The polyamide resins employed herein are of a dimer acid-modified type and are prepared through condensation of a dimer acid such as linolenic dimer acid with a polyamine which is a component of polyamide, such as ethylenediamine and diethylenetriamine with water removed.

Contrary to usual polyamide resins modified by adipic acid or the like, polyamide resins modified with dimer acids having 36 carbon chain are improved in flexibility, water-resistance, chemical resistance, abrasion resistance, and adhesion, although lacking in spinable properties. Particularly, the dimer acid-modified polyamide resins are outstandingly superior in adhesive properties to any other resins because of the presence of an aliphatic moiety and polar group in the molecule. Furthermore, the dimer acid-modified polyamide resins are low in melt viscosity and chemically inert.

The dimer acid-modified polyamide resins play a great role in the paint as both a film-forming agent and a pigment vehicle. The modified polyamide resin should be in an amount of 20 to 35% by weight of the total paint composition because a lesser amount of the resin will render the composition too viscous to apply as a coating, whereas a larger amount will render the composition too fluid and stainable as well as increasing the cost.

A plasticizer and, if desired, a thermoplastic resin are added to the dimer acid-modified polyamide resin to ensure the low temperature stability of the modified polyamide resin as a paint base, to reduce operating temperature at which molten paint is actually applied, and to stabilize paint coatings.

Usual plasticizers may generally be used, though plasticiers having relatively high freeze resistance, water resistance, migration and compatibility are preferred.

Preferred examples of the plasticizers are phthalic acid compounds, alcohol esters, amine, trimellitates, etc.

Specific examples of these are:

(1) Phthalates
  dimethyl phthalate, diethyl phthalate, dibutyl phthalate, di-n-octyl phthalate, di-isooctyl phthalate, di-(2-ethylhexyl)phthalate, dinonyl phthalate, isooctyl isodecyl phthalate, diisodecyl phthalate, diallyl phthalate, butyl benzyl phthalate, dimethoxyethyl phthalate (2) Trimellitates
  di-isooctyl mono-isodecyl trimellitate, tri-isooctyl trimellitate, tri-isodecyl trimellitate, trioctyl trimellitate (3) Alcohols
  Alfol alcohols such as Alfol 610 (mixture of saturated linear $C_6$, $C_8$ and $C_{10}$ alcohols) and Alfol 810 (mixture of saturated linear $C_8$ and $C_{10}$ alcohols)

(4) Amides
  toluenesulfonamide.

These plasticizers are used in the following amounts:

| Plasticizer | Amount based on the polyamide resin |
| --- | --- |
| (1) phthalate | 3–10%, preferably 5–8% |
| (2) trimellitate | 3–20%, preferably 10–12% |
| (3) alcohol | 3–10%, preferably 5–8% |

| -continued | | |
|---|---|---|
| Plasticizer | Amount based on the polyamide resin | |
| (4) amide | 3-20%, preferably 5-8% | |

In general, the plasticizer is added in an amount of 1 to 5% by weight of the composition. If the amount of the plasticizer is less than 1% by weight, the paint composition shows a poor fluidity when heated and melted so that it may be easily scorched. In addition, coatings obtained after the paint is applied are brittle. If the amount of the plasticizer is more than 5% by weight, the paint coating is slowly dried and easily stained.

The thermoplastic resins to be added to the dimer acid-modified polyamide resin according to the invention include hydrogenated rosin, rosin-modified maleic acid resin, terpene resins, ester gums, alkyd resins, polyester resins, etc. Of course, they should give the melt-adhesive traffic paint compositions the desired heat resistance, weatherability, adhesion, handling property, and compatibility.

The thermoplastic resin is added in an amount of 2 to 15% by weight of the composition. Unless the amount of the thermoplastic resin falls within this range, fluidity and weatherability deviate from the desirable ranges.

Examples of the inorganic fillers employed herein are silica sand, quartzite, marble grit, glass powder, alumina, etc. Particularly, silica sand, quartzite and alumina can provide paint coatings with considerable impact and other resistance against the action of spike tires or tire chains.

If the inorganic filler is present in a large amount, there is insufficient fluidity of paint during its application to road surfaces. If the filler is present in a small amount, durability and impact resistance are reduced. It is recommended to add the inorganic filler in an amount of 30 to 45% by weight of the composition.

The coloring pigments may include well-known pigments such as zinc white, lithopone, heat resistant chrome yellow, calcium carbonate, titanium oxide, etc. Among titanium oxide minerals, rutile-type titanium oxide is preferred to anatase-type. Particularly, in view of improving the durability and heat resistance of a paint coating, rutile-type titanium oxide is used for the best results. However, a mixture of rutile-type titanium oxide and zinc white at a mixing ratio of 1:1 or a mixture of rutile-type titanium oxide, anatase-type titanium oxide and zinc white at a mixing ratio of 1:1:1 may also be used.

As the reflective agent, glass bead is most preferred.

For other additives, use may be made of anti-settling agents such as white carbon, and antioxidants or reducing agents.

The present invention is further illustrated by the following examples. In the examples, all parts are parts by weight.

EXAMPLE 1

| | | Parts by weight |
|---|---|---|
| (a) | Dimer acid-modified polyamide resin* | 30 |
| (b) | Trioctyl trimellitate (plasticizer) | 5 |
| (c) | Calcium carbonate/marble grit**, 1/1 (inorganic filler) | 33.5 |
| (d) | Rutile-type titanium oxide (coloring pigment) | 15 |
| (e) | Glass bead (reflective agent) | 16 |

| -continued | | |
|---|---|---|
| | | Parts by weight |
| (f) | White carbon (anti-settling agent) | 0.5 |
| | Total | 100 |

*A dimer acid-modified polyamide resin manufactured and sold by Dai-ichi General Co., Ltd. (Tokyo, Japan) under the trade mark of "Versalon R".
**"Kansui-seki" (white marble) from Ibaragi, Japan.

Ingredients (c)–(f) were admixed in a mixer. The plasticizer (b) was incorporated therein, obtaining a homogeneous mixture. This mixture was inserted in a packaging bag and the dimer acid-modified polyamide resin (a) was separately introduced in the same bag, which was sealed to provide a paint package.

On use, the polyamide resin (a) was taken out of the bag, put into a heating vessel, and melted. With stirring, the remaining mixture consisting of the ingredients (b)–(f) was admitted into the vessel. When all the contents were fully molten, the paint was applied to a road surface. A coating having a thickness of 1.5 mm was formed at a temperature of 200° C. under a pressure of 40 poises. Test specimens were prepared to determine heat resistance, abrasion resistance, adhesion, water resistance, impact resistance, weatherability and handling property.

EXAMPLE 2

| | | Parts by Weight |
|---|---|---|
| (a) | Dimer acid-modified polyamide | 26 |
| (b) | TOTM (plasticizer) | 3 |
| (c) | Calcium carbonate/marble grit, 1/1 (inorganic filler) | 39.5 |
| (d) | Rutile-type titanium oxide (coloring pigment) | 15 |
| (e) | Glass bead (reflective agent) | 16 |
| (f) | White carbon (anti-settling agent) | 0.5 |
| | Total | 100 |

The procedure described in Example 1 were repeated to prepare a paint package and various tests were performed on specimens, except that a coating was formed under a pressure of 30 poises.

EXAMPLE 3

| | | Parts by Weight |
|---|---|---|
| (a) | Dimer acid-modified polyamide | 26 |
| (b) | TOTM (plasticizer) | 3 |
| (c) | Calcium carbonate/marble grit, 1/1 (inorganic filler) | 34.5 |
| (d) | Rutile-type titanium oxide (coloring pigment) | 15 |
| (e) | Glass bead (reflective agent) | 16 |
| (f) | White carbon (anti-settling agent) | 0.5 |
| (g) | Terpene resin (thermoplastic resin) | 5 |
| | Total | 100 |

Ingredients (c)–(f) were admixed in a mixer. The plasticizer (b) was incorporated therein, obtaining a homogeneous mixture. This mixture was placed in a packaging bag and the modified polyamide resin (a) and the thermoplastic resin (g) were separately introduced therein.

According to the procedures described in Example 1, test specimens were prepared. A coating having a thickness of 1.5 mm was formed at a temperature of 200° C. under a pressure of 20 poises.

EXAMPLE 4

| | | Parts by weight |
|---|---|---|
| (a) | Dimer acid-modified polyamide resin | 26 |
| (b) | TOTM (plasticizer) | 1 |
| (c) | Calcium carbonate/marble grit, 1/1 (inorganic filler) | 31.5 |
| (d) | Rutile-type titanium oxide (coloring pigment) | 15 |
| (e) | Glass bead (reflective agent) | 16 |
| (f) | White carbon (anti-settling agent) | 0.5 |
| (g) | Terpene resin (thermoplastic resin) | 10 |
| | Total | 100 |

The procedures described in Example 3 were repeated to prepare a paint package and various tests were performed on specimens.

COMPARATIVE EXAMPLE 1

| | | Parts by Weight |
|---|---|---|
| (a) | Rosin-modified polyester (thermoplastic resin) | 16 |
| (b) | Dioctyl phthalate (plasticizer) | 4 |
| (c) | Calcium carbonate/marble grit, 1/1 (inorganic filler) | 48.5 |
| (d) | Titanium oxide or lead white (coloring pigment) | 15 |
| (e) | Glass bead (reflective agent) | 16 |
| (f) | White carbon (anti-settling agent) | 0.5 |
| | Total | 100 |

According to the procedures described in Example 1, a composition based on a known thermoplastic resin, for example, rosin-modified polyester was prepared and test specimens were formed. A coating having a thickness of 1.5 mm was formed at a temperature of 200° C. under a pressure of 20 poises.

Tests were carried out on the specimens; heat resistance, a method similar to ASTM D-620-57 and D-795; adhesion, a method similar to ASTM C-321-64; impact resistance, a method similar to ASTM D-256-56T; and abrasion resistance and diffused reflective power to JIS K 5665.

The test results obtained in Examples 1 to 4 and Comparative Example 1 are tabulated in Table 1.

As apparent from Table 1, the present invention considerably improves abrasion resistance.

TABLE 1

| | Comparative Example 1 | Example 1 | Example 2 | Example 3 | Example 4 |
|---|---|---|---|---|---|
| Viscosity (200° C.); poise | 20 | 40 | 30 | 20 | 20 |
| Heat resistance (200° C., 2hrs); 45-0° reflective power % | 78 | 75 | 75 | 80 | 78 |
| Abrasion resistance (10 kg load, 1000 rpm); mg | 1100 | 100 | 105 | 105 | 110 |
| Adhesion (−30° C., 2hrs; room temp., 24 hrs; 5 cycles) | small cracks | no crack | no crack | no crack | no crack |
| Water resistance (immersed in water at room temp. for 3 months) | no change | no change | no change | no change | no change |
| Impact resistance (du Pont impact test at room temp., coating thickness 1.5 mm) | 500g/20cm | 1kg/50cm | 1kg/50cm | 1kg/50cm | 1kg/50cm |
| Impact resistance (same test as above, after cooling at −30° C. for 24 hrs) | 50g/5cm | 1kg/55cm | 1kg/50cm | 1kg/50cm | 1kg/50cm |
| Weatherability (weatherometer, 100 hrs exposure); 45-0° diffused reflective power % | 73 | 70 | 73 | 78 | 76 |

The results shown in the following Table 2 give evidence of the superior low temperature stability, abrasion characteristics, heat stability and flow characteristics of the compositions of the present invention.

TABLE 2

Physical properties of polyamide resin* combined with plasticizers

| | | | Plasticizer | | | | |
|---|---|---|---|---|---|---|---|
| | | | trioctyl trimellitate | Alfol 810 | dioctyl phthalate | toluene-sulfonamide | No plasticizer |
| | Amount (% by weight) | | 12 | 8 | 8 | 10 | — |
| Low temperature stability | Compressive strength, kg/cm² | −10° C. | 298 | 400 | 276 | 410 | 410 |
| | | −5° C. | 325 | 463 | 300 | 430 | 445 |
| | | 0° C. | 280 | 420 | 251 | 380 | 480 |
| | | 5° C. | 240 | 340 | 220 | 350 | 530 |
| | | 10° C. | 200 | 310 | 198 | 330 | 490 |
| | Impace resistance, g/cm | −10° C. | 500/30 | 300/30 | 500/40 | 300/30 | 100/10 |
| | | −5° C. | 500/40 | 300/30 | 500/50 | 300/30 | 100/20 |
| | | 0° C. | 1000/50 | 500/50 | 1000/50 | 500/50 | 300/30 |
| | | 5° C. | 1000/50 | 1000/50 | 1000/50 | 1000/50 | 300/50 |
| | | 10° C. | 1000/50 | 1000/50 | 1000/50 | 1000/50 | 300/50 |
| Abrasion at −5° C. (load 10kg, 1000rpm), mg | | | 78 | 75 | 80 | 100 | 128 |
| Heat loss or heat stability of plasticizer (250° C., 90 min.), % | | | 6.5 | 7.2 | 16.3 | 8.6 | — |

TABLE 2-continued

Physical properties of polyamide resin* combined with plasticizers

| Amount (% by weight) | Plasticizer | | | | |
|---|---|---|---|---|---|
| | trioctyl trimellitate 12 | Alfol 810 8 | dioctyl phthalate 8 | toluene-sulfonamide 10 | No plasticizer — |
| Flow of paint, sec/200° C. | 7.8 | 6.5 | 5.0 | 7.0 | 48 |

*Versalon
1. For compressive strength, samples having lower values at low temperatures are desirable. For impact resistance, samples exhibiting higher load value/higher height value at low temperatures are desirable.
2. For heat stability, plasticizers having a lower heat loss are desirable.
3. Samples having a short time for flow are desirable.

What is claimed is:

1. A melt-adhesive traffic paint composition having improved low temperature stability consisting essentially of:
    20-35% by weight of a dimer acid modified polyamide resin, said polyamide resin being prepared by condensing a dimer acid with a polyamine selected from the group consisting of ethylenediamine and diethylenetriamine,
    1-5% by weight of a plasticizer selected from the group consisting of a phthalate, a trimellitate, a mixture of saturated linear $C_6$, $C_8$ and $C_{10}$ alcohols, a mixture of saturated linear $C_8$ and $C_{10}$ alcohols and a toluenesulfonamide,
    30-45% by weight of an inorganic filler,
    the balance being a coloring pigment and a reflective agent.

2. A paint composition according to claim 1 wherein the content of the inorganic filler is 30-40% by weight and the composition further contains 2-15% by weight of a thermoplastic resin selected from the group consisting of hydrogenated rosin and rosin-modified maleic acid resins.

3. A paint composition according to claim 1 wherein said plasticizer is dioctyl phthalate, trioctyl trimellitate, a mixture of saturated linear $C_6$ and $C_8$ alcohols or toluenesulfonamide.

4. A paint composition according to claim 1 or 2 wherein said inorganic filler is selected from silica sand, quartzite, marble grit, glass power and alumina.

5. The composition according to claim 1 wherein said dimer acid-modified polyamide resin is a polyamide in which the dimer acid is linoleic dimer acid.

6. The composition according to claim 1 wherein the plasticizer is a phthalate selected from the group consisting of dimethyl phthalate, diethyl phthalate, dibutyl phthalate, di-n-octyl phthalate, di-isooctyl phthalate, di-(2-ethylhexyl)phthalate, dinonyl phthalate, isooctyl isodecyl phthalate, diisodecyl phthalate, diallyl phthalate, butyl benzyl phthalate and dimethoxyethyl phthalate.

7. The composition according to claim 1 wherein the plasticizer is a trimellitate from the group consisting of diisooctyl mono-isodecyl trimellitate, tri-isooctyl trimellitate, tri-isodecyl trimellitate and trioctyl trimellitate.

8. The composition according to claim 1 wherein the plasticizer is a toluenesulfonamide.

9. A melt-adhesive traffic paint composition having improved low temperature stability consisting essentially of:
    20-35% by weight of a dimer acid-modified polyamide resin,
    1-5% by weight of a plasticizer selected from the group consisting of a mixture of saturated linear $C_6$, $C_8$ and $C_{10}$ alcohols and a mixture of saturated linear $C_8$ and $C_{10}$ alcohols,
    30-45% by weight of an inorganic filler,
    the balance being a coloring pigment and a reflective agent.

10. A paint composition according to claim 9 wherein the content of the inorganic filler is 30-40% by weight and the composition further contains 2-15% by weight of a thermoplastic resin selected from the group consisting of hydrogenated rosin and rosin-modified maleic acid resins.

11. A paint composition according to claim 9 wherein said inorganic filler is selected from silica sand, quartzite, marble grit, glass powder and alumina.

12. The composition according to claim 9 wherein said dimer acid-modified polyamide resin is a polyamide in which the dimer acid is linolenic dimer acid.

* * * * *